(No Model.) 2 Sheets—Sheet 1.
L. FRIEDMANN.
PIPE COUPLING FOR STEAM AND AIR PIPES.
No. 554,255. Patented Feb. 11, 1896.
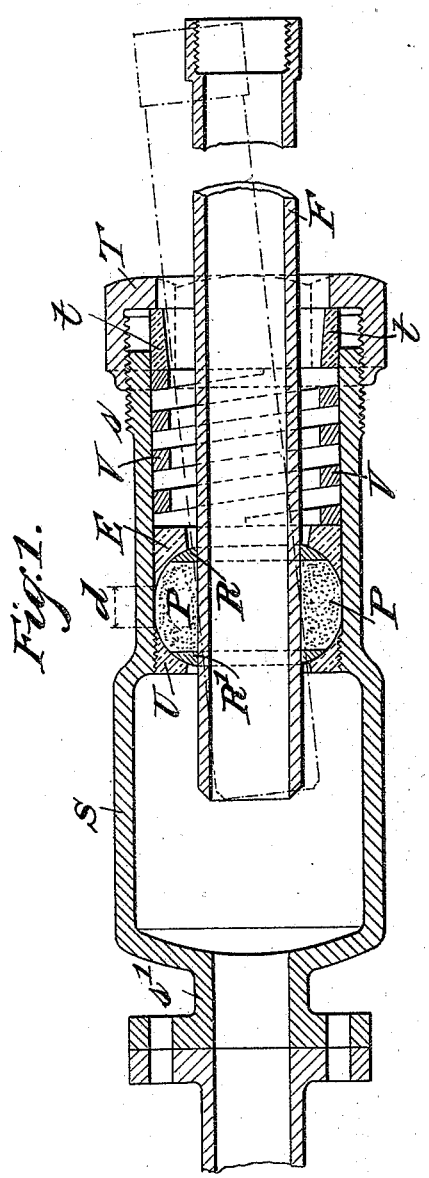
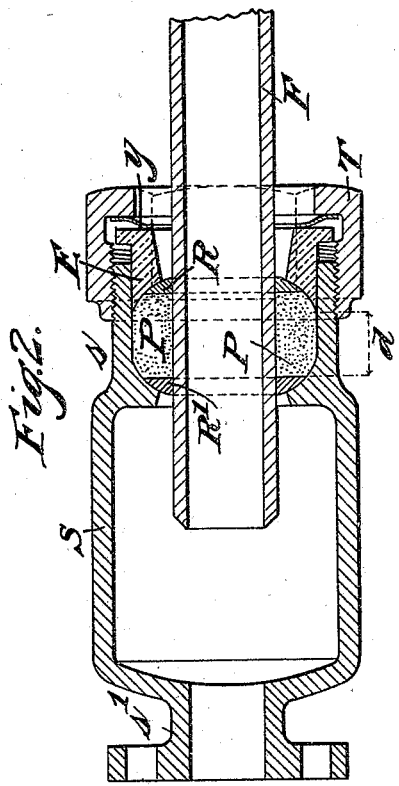

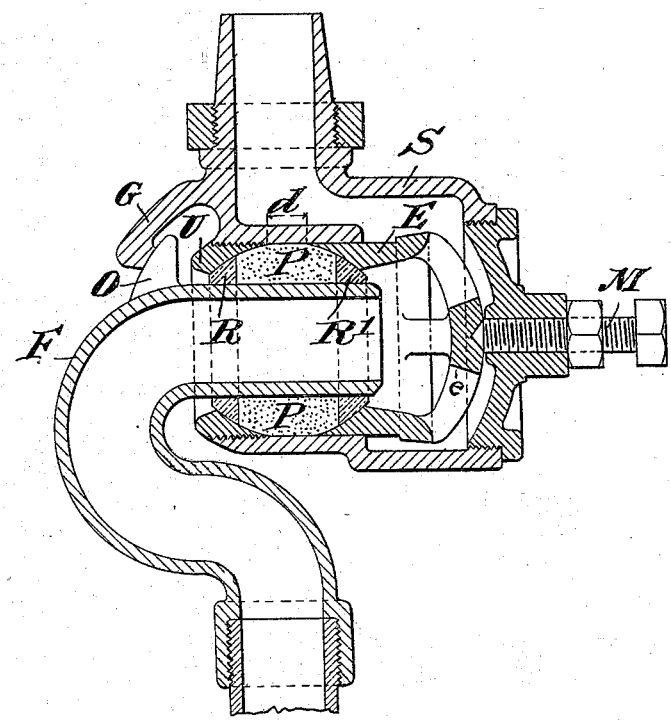

UNITED STATES PATENT OFFICE.

LOUIS FRIEDMANN, OF VIENNA, AUSTRIA-HUNGARY.

PIPE-COUPLING FOR STEAM AND AIR PIPES.

SPECIFICATION forming part of Letters Patent No. 554,255, dated February 11, 1896.

Application filed May 14, 1895. Serial No. 549,264. (No model.) Patented in Austria January 19, 1895, No. 45/250, and in Hungary February 1, 1895, No. 2,105.

*To all whom it may concern:*

Be it known that I, LOUIS FRIEDMANN, manufacturer, a subject of the Emperor of Austria-Hungary, residing at Vienna, in the Province of Lower Austria, in the Empire of Austria-Hungary, have invented certain new and useful Improvements in Pipe-Couplings for Steam and Air Pipes, (for which patents have been obtained in Austria, No. 45/250, dated January 19, 1895, and in Hungary, No. 2,105, dated February 1, 1895;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to couplings for pipes, and more particularly to that class of couplings adapted for use in coupling steam and air pipes for railway-carriages, in which the coupled pipe section or sections have motion relatively to one another in one or more directions. In the construction of this class of couplings a greater or less number of movable joints are now required between the several parts of the coupling, in order to permit of the desired or required motion of the movable parts relatively to the fixed parts. These couplings are not only expensive, but are liable to leakage; and the object of my invention is to so construct the coupling as to avoid the use of the movable joints heretofore employed, and this I accomplish in various ways, as will now be fully described, reference being had to the accompanying drawings, in which—

Figure 1 is a longitudinal vertical sectional view of one part of a pipe-coupling embodying my invention, and Figs. 2 and 3 are like views illustrating structural modifications.

Referring to Fig. 1, the coupling consists essentially of a casing S, provided at one end with a flanged branch $s'$ for connection with one terminal of a line of fixed piping, said casing having its other end contracted or reduced in diameter to form a coupling-sleeve $s$.

At the inner end of the sleeve $s$ is arranged a fixed ring U, which may be secured in position by screwing it into the sleeve, or said ring may form an integral part of said sleeve. There is a second loose ring E, similar to ring U, that fits snugly into the bore of sleeve $s$, and through said ring extends the pipe F, by means of which two fixed pipe-sections are coupled together. Between the rings U E is arranged a packing P, of any suitable material, to form a fluid-tight joint between the casing and its sleeve. To the outer end of the sleeve $s$ is screwed a screw-cap T, that has bearing on a sleeve $t$, which latter seats on one end of a coiled or helical spring V, interposed between said sleeve $t$ and the more or less loose ring E, whereby the packing P can be properly compressed.

By means of the described arrangement of packing P and packing-rings U E the said packing forms practically a fulcrum for and with which the coupling-pipe F is adapted to oscillate or vibrate.

The opening in the rings U E, cap T and bore of sleeve $t$ is of such diameter as not to impede the rotary and endwise or longitudinal and rocking motion of the pipe F. In order to facilitate this vibrating motion of pipe F and also in order to reduce the wear of the packing as much as possible, I dish or concave the proximate faces of rings U E and interpose between said rings and packing wear-plates or washers R' R, respectively, whose faces in contact with rings U E are convex, the convexity of said wear-plates or washers fitting the concavity of the rings. As shown, the wear-plates or disks R' and R fit the pipe F snugly and partake of the rocking or oscillating motion of said pipe.

If desired, the sleeve $t$ may be formed integral with the screw-cap T, the helical spring V may be dispensed with and the packing-ring E constructed in the form of a packing-gland, its inner end being suitably concaved, so that the screw-cap T will act directly upon the outer end of the gland or upon leaf-springs $y$ secured to the cap and having bearing on said outer end of the gland, as shown in Fig. 2. Of course it will be understood that the opposite end of pipe F is coupled, as described, with the other terminal of line of fixed piping by means of a coupling such as described.

If desired, the inner end of pipe F may be provided with a stop-collar (not shown) to prevent its pulling out of the coupling.

From what has been said it will be seen that the coupled pipe-section F is not only free to revolve about its longitudinal axis and move endwise in the coupling-sleeves, but also to vibrate or oscillate in any direction in the bearing for the packing formed by the rings U E. When the pipe F moves in a longitudinal direction the packing P and wear-plates R' R remain stationary, but when the said pipe vibrates then the packing, as well as the washers or wear-plates R' R, oscillates with it, the said washers taking up the greater part of the wear.

The bearings for the packing P may be constructed to form a ball-and-socket joint, as shown in Fig. 3, and the compressing spring or springs may be dispensed with, the ring or gland E being provided with a yoke $e$ recessed at the hub, from which the yoke-arms branch for the reception of a compressing-screw M that works in a threaded bearing in the screw-cap, and instead of providing the inner end of the coupled pipe-section with a stop-collar, as hereinbefore referred to, said pipe may be provided with a lug or horn O, fitting under an overhanging abutment G on the casing, so as to allow the pipe F to oscillate freely with the packing P in the bearings U E, and to have a limited rotary motion about its axis, but no endwise motion. Such motion may also be limited or prevented altogether by securing one of the washers or wear-plates or rings R' R to or forming it integral with the pipe F.

By an inspection of the drawings it will be seen that there is but a comparatively small portion of the packing P in direct contact with the sleeve $s$, as indicated at $d$, another small portion of such packing being in contact with the bearing-rings U E, and by the means provided any wear of the packing may be readily taken up or compensated and a tight joint between the coupled devices maintained.

If it is desired to obtain a universal coupling-joint, this may be attained by interposing in the coupling-pipe F a coupling such as shown in Fig. 3 or an ordinary rotary joint.

In its general arrangement the coupling is substantially a stuffing-box, in which the coupling-pipe F is adapted to revolve and vibrate, or to revolve, vibrate, and move in a longitudinal direction.

The construction of the coupling is very simple and durable, and can be repacked with ease whenever this is required, and is not as liable to leakage as is the case with couplings now in use.

Having thus described my invention, what I claim as new therein, and desire to secure by Letters Patent, is—

1. A pipe-coupling, comprising a stuffing-box provided with an axially-apertured concave seat and a packing adapted to rock on said seat, said packing provided with an axial aperture, in combination with an axially-apertured loose ring provided with a concave face bearing on the packing, an adjustable compressing device acting on the loose ring to compress the packing, and a coupling-pipe extending through the ring, the packing and its seat, for the purpose set forth.

2. A pipe-coupling comprising a stuffing-box provided with an axially-apertured concave seat and an axially-apertured packing adapted to rock on said seat, in combination with an axially-apertured loose ring provided with a concave face bearing on the packing, a compressing-spring acting on the loose ring, an adjusting device for adjusting the tension of the spring and a coupling-pipe extending through the stuffing-box and its packing, for the purpose set forth.

3. A pipe-coupling comprising a stuffing-box adapted to be secured to a fixed pipe, a fixed and an adjustable abutment within the box, said abutments having proximate concave faces, and axial openings of greater diameter than the coupling-pipe, wear-plates or washers having convex outer faces fitting the concave faces of the abutments, and axial openings of the same diameter as the coupling-pipe, in combination with such coupling-pipe extending through the abutments, washers, and packing, for the purpose set forth.

4. A pipe-coupling comprising a stuffing-box adapted to be secured to a fixed pipe, a fixed and an adjustable abutment within the box, said abutments having proximate concave faces, and axial openings of greater diameter than the coupling-pipe, wear-plates or washers of less diameter than the bore of the stuffing-box, said washers having convex outer faces fitting the concave faces of the abutments, and axial openings of the same diameter as the coupling-pipe, in combination with such coupling-pipe extending through the abutments, washers, and packing, for the purpose set forth.

In testimony whereof I affix my signature in presence of two witnesses.

LOUIS FRIEDMANN.

Witnesses:
DEAN B. MASON,
HARRY BELMONT.